Jan. 13, 1959 F. PORTAIL 2,869,064
APPARATUS AND METHOD FOR ENHANCING THE
CHARACTERISTICS OF DRY CELL BATTERIES
Filed Aug. 3, 1953
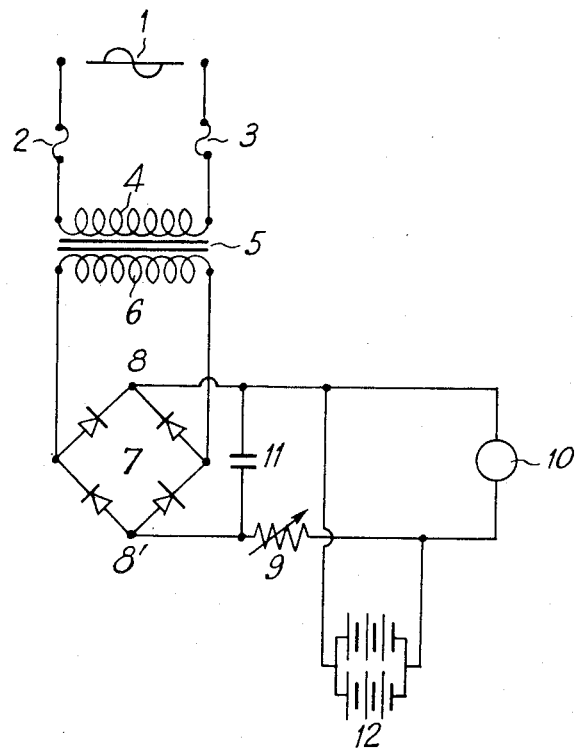
INVENTOR:
FERNAND PORTAIL
BY:

United States Patent Office 2,869,064
Patented Jan. 13, 1959

2,869,064

APPARATUS AND METHOD FOR ENHANCING THE CHARACTERISTICS OF DRY CELL BATTERIES

Fernand Portail, Paris, France, assignor to Societe Anonyme: Compagnie Industrielle des Piles Electriques Cipel, a French company, Argenteuil, France Application August 3, 1953, Serial No. 372,062

Claims priority, application France August 30, 1949

14 Claims. (Cl. 320—3)

This invention relates to a process and apparatus used in conjunction with the process, and involves the forming of primary batteries prior to any loss of its original capacity to enhance the characteristics of the batteries. It has been found that batteries subjected to this process acquire superior qualities to those exhibited by batteries immediately after manufacture thereof.

This application is a continuation-in-part of my U. S. application Serial No. 165,793, filed June 2, 1950, entitled "Sources of Direct Current Energy."

In my U. S. application Serial No. 165,792, filed on June 2, 1950, entitled "Direct Current Feed Device for Electric Apparatus," I propose the use of an assembly as a buffer unit in a circuit including a rectifier. The assembly comprises a battery of generator cells containing an alkaline electrolyte and a battery of generator cells containing ammonia salt, both these batteries being connected in parallel.

It has also been previously suggested to use rectified current for de-polarizing battery cells polarized in service.

It is an object of the present invention to provide a process for forming batteries prior to use or deterioration thereof in order to improve the characteristics of a battery of dry cells.

It is another object of the present invention to provide a process to be used on manufactured dry cells prior to any loss of their capacity which will impart to the battery of dry cells characteristics which are superior to those normally obtained in batteries immediately after manufacture.

It is still another object of this invention to provide a process which when applied to a battery of dry cells prior to use or deterioration thereof will result in a battery having a low internal resistance making the battery suitable for use as a buffer in electrical circuits.

These and other objects will become more apparent from the detailed description which follows and from the accompanying drawing which illustrates a simplified wiring diagram, by way of example, for carrying out the invention.

I have discovered that when a battery of dry cells, which has never been used nor has been permitted to deteriorate, and has therefore lost no part of its original capacity is subjected to the action of direct or rectified current of low magnitude for a sufficient period of time, the internal resistance of the battery decreases and that the battery acquires superior characteristics to those which it had when first manufactured.

The particular type of cell to which this applies is the type in which the electrolyte consists of a solution of ammonia salts immobilized in the usual manner. The soluble electrode is made of zinc and the insoluble electrode is made of carbon de-polarized by manganese dioxide, or de-polarizing carbon (air de-polarization), or a mixture of both. Batteries of this type have been described, for example, in the U. S. Patents No. 1,588,607, filed on April 10, 1924, and No. 1,631,642, filed on January 13, 1925. The battery forming step, according to the present invention, may be accomplished by connecting the battery, prior to use or deterioration thereof, across a source of direct current such that the voltage across the terminals of the battery is in the range of $N \times 1.65$ volts to $N \times 2$ volts, where N is the number of cells coupled in series in the battery. The input current fed to the battery as measured by a direct current ammeter may be, e. g. 40 milliamperes per square decimeter of the soluble electrode area. In other words, if the cells making up the battery each have a soluble electrode area of S square decimeters and if the battery consists of N such cells in series and P cells in parallel, then the forming current should be adjusted to approximately $S \times P \times 40$ ma. The above figures are given for purposes of illustration and are not to be deemed as limitations, since the current value may be varied within a wide range without departing from the scope of the invention.

The term "forming," for lack of a better term to define the changes that transpire within a battery, be they physical or chemical, is herein used to denote the action which takes place within the battery and which results in enhanced battery characteristics when the battery is subjected to the process in accordance with the invention.

Referring to the drawing, an alternating current source 1 is connected via the protecting fuses 2 and 3 across the primary winding 4 of the transformer 5. The secondary winding 6 of the transformer is connected to two opposite terminals of a bridge rectifier cell. The rectified voltage output is obtained from the two opposite terminals 8, 8' of bridge rectifier 7. Connected between the terminal 8' of the bridge rectifier 7 and one terminal of the load 10 is a variable current limiting resistor 9, the other terminal of the load 10 being connected to terminal 8 of the bridge rectifier 7. A filter condenser 11 is connected between terminals 8, 8' of bridge rectifier 7. A battery of cells 12, which is to be formed, is connected directly across the terminals of the load 10. The variable resistor 9 interposed between terminal 8' of the bridge rectifier 7 and the load 10 is used for adjusting the amount of current flow through the battery 12.

The battery 12 may be formed before it is connected in a buffer circuit with the rectifier, as already stated. It can also be formed by the rectifier itself before the installation is put into service. Then, again, the battery may be formed by connecting it across the rectifier supplying the load apparatus and adjusting the rectifier output so that the voltage measured across battery 12 is greater than the natural electro motive force existing across the battery to be formed. The rectifier output should be, furthermore, so adjusted that it substantially compensates for the electrical energy consumed by the load (e. g. the output current exceeds the mean current absorbed by the load by the amount required to form the battery). In the latter case, where the battery is formed by connecting it across the rectifier supplying the load apparatus, a further adjustment of the rectifier output becomes necessary a day or two later to adjust its output level to a value approximating that strictly necessary to supply the power requirements of the load.

In some installations it is difficult to ascertain the power requirements of the load especially when the installation involves signalling aparatus for roadways or central automatic telephone exchanges. It has been determined that the desired compensation for the electrical energy consumed by the load will be automatically obtained if the voltage applied to the terminals of the battery after it has been formed exceeds the natural electromotive force of the battery by approximately 5 to 10%.

Thus, for example, if the cells making up the battery use as a depolarizing agent a mixture of maganese dioxide and porous carbon, such cells having an electro-motive force of 1.48 volts, the adjustable resistor 9 should be adjusted so as to yield at the terminals of the cells after they have been formed a voltage in the vicinity of 1.6 volts. If, on the other hand, the cells use depolarizing carbon (air depolarization) as a depolarizing agent, such cells having an electro-motive force of 1.4 volts, the resistor 9 should be adjusted so that an electro-motive force of 1.5 volts is obtained across the terminals of the cells after they have been formed. By maintaining the voltage across the terminals of the cells at a level which is 5 to 10% greater than the natural electro-motive force across the cells, the apparatus can function for a number of months without appreciable use of the cells.

The following data was obtained during the formation of three differencet types of dry cells of the type including ammonia salt and an immobilized liquid. The enhanced characteristics obtained is apparent from the data which follows:

(3) Test the flash current.
(4) Connection for 26 hours to the terminals of a rectifier so adjusted that a reverse current of 75 milliamperes, checked with a D. C. ammeter, passes through the battery.
(5) Test for flash current.

On the second battery operations 2 and 3 were omitted. The results are tabulated below:

| Flash Current Tests | First Battery, amps. | Second Battery, amps. |
|---|---|---|
| 1. (corresponding to step 1 above) on the new batteries | 33.5 | 32 |
| 2. (corresponding to step 3 above) after 9 or 10 days of discharge | 16 | |
| 3. (corresponding to step 5 above) after 26 hours of formation | 16 | 42.5 |

These results show conclusively the enhanced char-

| | Battery Type AD 526 | Battery Type AD 538 | Battery Type AD 517 |
|---|---|---|---|
| Dimensions in mm. (not including the terminals) | Height 152 mm., diameter 66 mm. | 160 x 70 x 60 mm. | 180 x 105 x 105. |
| Surface area of the zinc anode | 1.8 dm.² | 2 dm.² | 8.6 dm.² |
| Cathode constituents | Mixture of natural manganese dioxide and of de-polarizing carbon (air depolarization) pressed around a carbon rod. | Same as type AD 526. | Same as type AD 526. |
| Electrolyte | Solution of ammonium chloride and of zinc chloride immobilized by a meal. | Same as type AD 526. | Same as type AD 526. |
| Flash Current of the new battery | 7.2 amps | 11.4 amps | 32 amps. |
| E. M. F. of the new battery | 1.45 volts | 1.46 volts | 1.44 volts. |

| | Time (hrs.) | Term. Volt. (volts) | Time (hrs.) | Term. Volt. (volts) | Time (hrs.) | Term. Volt. (volts) |
|---|---|---|---|---|---|---|
| Connection to the terminals of a D. C. source so adjusted that a reverse current of 75 ma. flows through the battery | 0 | 1.525 | 0 | 1.54 | 0 | 1.45 |
| | 1 | 1.62 | 1 | 1.63 | 2 | 1.52 |
| | 2 | 1.65 | 2 | 1.66 | 3\%2 | 1.54 |
| | 3 | 1.685 | 3 | 1.69 | 5½ | 1.56 |
| | 17 | 1.85 | 17 | 1.90 | 20⅔ | 1.64 |
| | 20 | 1.88 | 20 | 1.92 | 22⅙ | 1.66 |
| | | | | | 24½ | 1.66 |
| | | | | | 26 | 1.67 |

| | | | |
|---|---|---|---|
| Flash current after formation | 10.5 amps | 16.2 amps | 42.5 amps. |
| E. M. F. 30 min. after the cessation of formation of the battery. | 1.77 volts | 1.84 volts | 1.64 volts. |

From the above table, it will be seen that, with a ratio of reverse current to the area of soluble (zinc) electrode of approximately 40 milliamperes per square decimeter, as used in treating the two batteries type AD526 and type AD538 for a period of 20 hours, the proportionate reduction in internal resistance, and consequently the percentual increase in flash current, are greater than when a substantially lower ratio of reverse current to the area of soluble (zinc) electrode is employed for a longer period, for example, as in the treatment of the type AD517 battery with a reverse current of 8.7 milliamperes per square decimeter of soluble (zinc) electrode for a period of 26 hours. However, even in the case of the formation of the type AD517 battery with the lower ratio of reverse current to the area of the soluble (zinc) electrode, it will be apparent that a substantial increase in the flash current, and consequently a substantial decrease in the internal resistance, have been achieved in accordance with the invention as compared with the corresponding characteristics of the battery before any loss of its original capacity.

The following data was obtained when testing two new batteries of the type AD517.

On the first one the sequence of operation was
(1) Test for flash current.
(2) Discharge on 5 ohms for 9 or 10 days (about 20% of the rated capacity).

acteristics obtained when forming a battery prior to use or deterioration thereof. The data also shows that the formation of a battery which has not been previously used nor has been permitted to deteriorate, reduces the internal resistance of the battery below its original value, while if the same treatment is applied to a battery which has lost its initial characteristics through being partly discharged, the internal resistance is practically unaffected by the passage of the reverse current of 75 milliamperes therethrough for a period of 24 hours. The relationship between flash current tests and the internal resistance of a battery is well known. The decrease in flash current reflects the increase of the internal resistance of the battery.

It will be understood that each of the elements described above, or two or more together, may also find a useful application in other types of rectifier arrangements differing from the types described above.

I claim:
1. A process for enhancing the characteristics of a dry cell battery of the type including ammonia salts comprising the step of subjecting said battery before any loss of its original capacity to the action of direct current flowing through said battery in the direction opposed to the normal flow of current from said battery when connected alone to an external load, thereby to reduce the internal resistance of the battery.

2. A process for enhancing the characteristics of a dry cell battery of the type including ammonia salts comprising the step of subjecting said battery before any loss of its original capacity to the action of between 70 to 100 milliamperes of direct current flowing through said battery in the direction opposed to the normal flow of current from said battery, when connected alone to an external load, thereby to reduce the internal resistance of the battery.

3. A process for enhancing the characteristics of a dry cell battery of the type including ammonia salts and having a predetermined voltage across its terminals, comprising the steps of connecting said battery, before any loss of its original capacity, in parallel with a D. C. voltage source having a voltage across its terminals which is greater than said predetermined voltage of said dry cell battery resulting in direct current flow through said dry cell battery which is in a reverse direction to normal current flow from the dry cell battery when connected to an external load, thereby reducing the internal resistance of the dry cell battery.

4. A process for enhacing the characteristics of a dry cell battery of the type including ammonia salts comprising the step of subjecting said battery before any loss of its original capacity to the action of a direct current voltage connected across said battery to cause a direct current flow through said battery in the direction opposed to the normal flow of current from said battery when connected alone to an external load, thereby to reduce the internal resistance of the battery, said voltage having a numeral value ranging between $N \times 1.65$ volts to $N \times 2$ volts, where N is the number of cells connected in series in said battery.

5. A process for enhancing the characteristics of a dry cell battery of the type including ammonia salts comprising the step of subjecting said battery before any loss of its original capacity to the action of rectified alternating current to cause a direct current flow through said battery in the direction opposed to the normal flow of current from the battery when connected alone to an external load, thereby to reduce the internal resistance of the battery.

6. A process for enhancing the characteristics of a dry cell battery of the type including ammonia salts and having a predetermined voltage across its terminals, wherein said battery is mounted as a buffer generator across a load and in parallel with a rectifier having a voltage across its terminals which is greater than said predetermined voltage of said dry cell battery, the preliminary forming step comprising the step of subjecting said battery before any loss of its original capacity to the action of direct current from said rectifier flowing through said battery in the direction opposed to the normal flow of current from the battery when connected alone to an external load and for a sufficient time to substantially reduce the internal resistance of said battery.

7. A process as in claim 6 wherein said forming step is accomplished after said battery and said rectifier are connected as a circuit across said load.

8. A process for enhancing the characteristics of a dry cell battery of the type including ammonia salts and having a predetermined voltage across its terminals, comprising the steps of connecting said battery prior to any loss of its original capacity across a load and in parallel with a rectifier having across its terminals a voltage which is greater than said predetermined voltage across the terminals of said battery; initially adjusting the rectifier current output to a value substantially higher than the current consumed by the load so that a direct current flows through said battery in the direction opposed to the flow of current from the battery when connected alone to an external load; maintaining such adjustment until the internal resistance of said battery has been substantially reduced; and reducing said rectifier current output so as to supply only the current required by said load.

9. A process for enhancing the characteristics of a dry cell battery of the type including ammonia salts and having a predetermined voltage across its terminals, wherein said battery is mounted as a buffer generator across a load and in parallel with a rectifier having a voltage across its terminals which is greater than said predetermined voltage of said dry cell battery, the preliminary forming step comprising the step of subjecting said battery before any loss of its original capacity to the action of direct current from said rectifier flowing through said battery in the direction opposed to the normal flow of current from the battery when connected alone to an external load, and maintaining said direct current flow through said battery from the rectifier for approximately 20 to 26 hours to substantially reduce the internal resistance of said battery.

10. A process for enhancing the characteristics of a dry multi-cell battery of the type including ammonia salts and having a predetermined voltage across its terminals, comprising the steps of connecting said battery prior to any loss of its original capacity across a load and in parallel with a rectifier having across its terminals a voltage which is greater than said predetermined voltage across the terminals of said battery and having a numerical value ranging between 1.65–2.0 multiplied by the number of cells connected in series in said dry multi-cell battery; initially adjusting the rectifier current output to a value substantially higher than the current consumed by the load, thereby to cause a direct current to flow through said battery in the direction opposed to the normal flow of current from said battery when connected alone to an external load; maintaining said current output adjustment until the internal resistance of said battery has been substantially reduced; and reducing said rectifier current output so as to supply only the current required by said load.

11. A process for enhancing the characteristics of a dry multi-cell battery of the type including ammonia salts and having a predetermined voltage across its terminals, comprising the steps of connecting said battery prior to any loss of its original capacity across an alternating current rectified in a buffer circuit having a load connected therein; initially adjusting the voltage across said rectifier at a numerical value ranging between 1.65 to 2.0 multiplied by the number of cells of said dry multi-cell battery, the numerical voltage value at the initial adjustment being greater than the value of said predetermined voltage across the battery to cause a rectified direct current to flow through said battery in the direction opposed to the normal flow of current from the battery when connected alone to an external load; maintaining said voltage until the internal resistance of the multi-cell battery has been substantially reduced; and thereafter adjusting the voltage across said rectifier so that the latter then supplies only approximately the power requirements of said load in the buffer circuit.

12. A process for enhancing the characteristics of a dry cell battery of the type provided with carbon and zinc electrodes, comprising the step of subjecting said battery prior to any loss of its original capacity to a direct current of approximately 40 milliamperes per square decimeter of the soluble zinc electrode area flowing through the battery in the direction opposed to the normal flow of current from the battery when connected alone to an external load.

13. An arrangement for enhancing the characteristics of a dry cell battery of the type including ammonia salts prior to any loss of its capacity in a buffer circuit, said dry cell battery having a predetermined voltage across its terminals comprising, in combination, a rectifier adapted to be connected to the terminals of a battery to be formed, said rectifier having across its terminals a voltage which is greater than said predetermined voltage across the terminals of the dry cell battery; a load connected to the terminals of said rectifier; and means for adjusting the output of said rectifier so that the output current obtained from said rectifier is greater than the current required by said load, thereby to cause a recruited direct current flow through said battery in the direction opposed to the normal flow of current from the battery when connected alone to an external load for reducing the internal resistance of the battery, and so that the output current from said rectifier may then be reduced to supply only approximately the power requirements of said load.

14. A process for enhancing the characteristics of a dry cell battery of the type including ammonia salts comprising the step of subjecting said battery before any loss of its original capacity to the action of direct current flowing through the battery in the direction opposed to the normal flow of current from the battery when connected alone to an external load for approximately 20 to 26 hours to reduce the internal resistance of the battery.

References Cited in the file of this patent

UNITED STATES PATENTS

| | | |
|---|---|---|
| 1,588,607 | Oppenheim | June 15, 1926 |
| 1,631,647 | Robinson | June 7, 1927 |
| 2,000,571 | Oswald | May 7, 1935 |
| 2,036,547 | Siemon | Apr. 7, 1936 |
| 2,369,033 | Eubank | Feb. 6, 1945 |
| 2,424,059 | Scott | July 15, 1947 |

FOREIGN PATENTS

| | | |
|---|---|---|
| 998,615 | France | Sept. 26, 1951 |